(12) United States Patent
Lainet et al.

(10) Patent No.: US 7,284,397 B2
(45) Date of Patent: Oct. 23, 2007

(54) METHOD OF CONTROLLING THE POLARIZATION MODE DISPERSION OF AN OPTICAL FIBER DURING FIBER DRAWING

(75) Inventors: Eric Lainet, Maisons Laffitte (FR); Frédéric Hayrault, Marly la Ville (FR); Daniel Coelho, Jouy-le-Moutier (FR)

(73) Assignee: Draka Comteq B.V., Amsterdam (NL)

(*) Notice: Subject to any disclaimer, the term of this patent is extended or adjusted under 35 U.S.C. 154(b) by 562 days.

(21) Appl. No.: 10/733,639

(22) Filed: Dec. 12, 2003

(65) Prior Publication Data
US 2004/0123629 A1 Jul. 1, 2004

(30) Foreign Application Priority Data
Dec. 31, 2002 (FR) .................... 02 16890

(51) Int. Cl.
*C03B 37/07* (2006.01)

(52) U.S. Cl. .............. 65/377; 65/381; 65/402; 65/438; 65/484

(58) Field of Classification Search .............. 65/378, 65/402, 438, 377, 381, 435, 484, 486, 533, 65/535
See application file for complete search history.

(56) References Cited

U.S. PATENT DOCUMENTS
2004/0042747 A1* 3/2004 Kim et al. .............. 385/123

FOREIGN PATENT DOCUMENTS
EP 1 258 751 A 11/2002
WO WO 00/69782 11/2000

* cited by examiner

*Primary Examiner*—Steven P. Griffin
*Assistant Examiner*—Queenie Dehghan
(74) *Attorney, Agent, or Firm*—Sughrue Mion Pllc.

(57) ABSTRACT

An optical fiber drawing installation is equipped with an oscillating pulley that applies torsion to the fiber alternately in one rotation direction and then in the opposite direction. To control the torsion applied to the fiber, images are formed of the fiber and the pulley. The images are analyzed to determine the position of the fiber relative to the pulley. The torsion is calculated from the calculated position, on the assumption that the fiber rolls on the pulley.

6 Claims, 2 Drawing Sheets

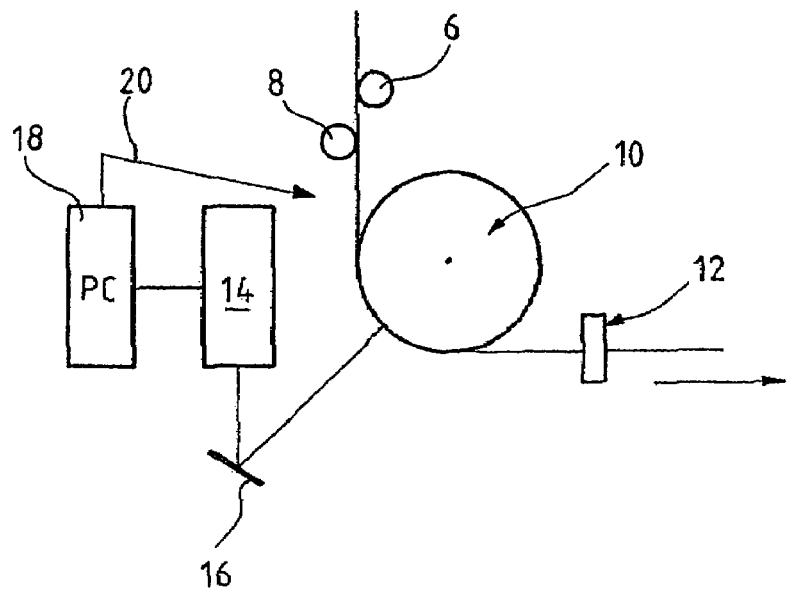
FIG_1
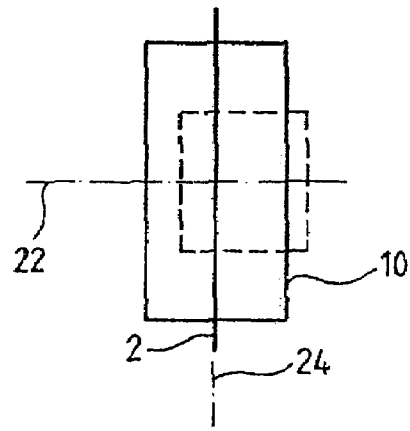
FIG_2
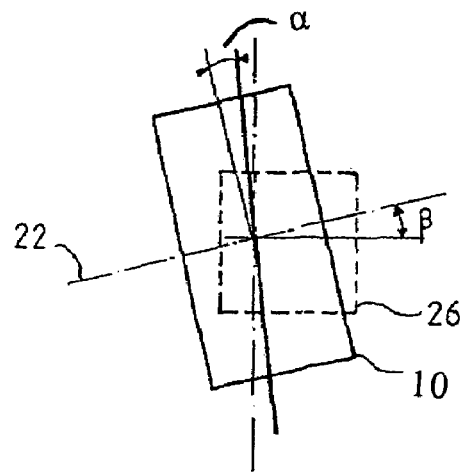
FIG_3

FIG_4
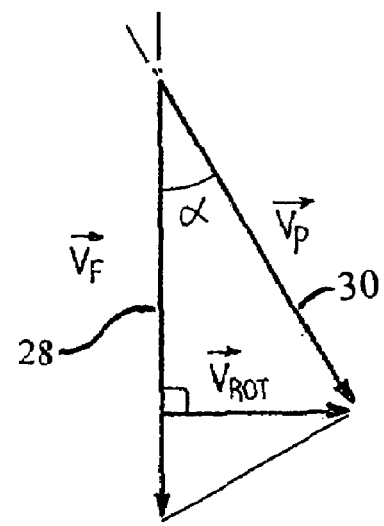
FIG_5
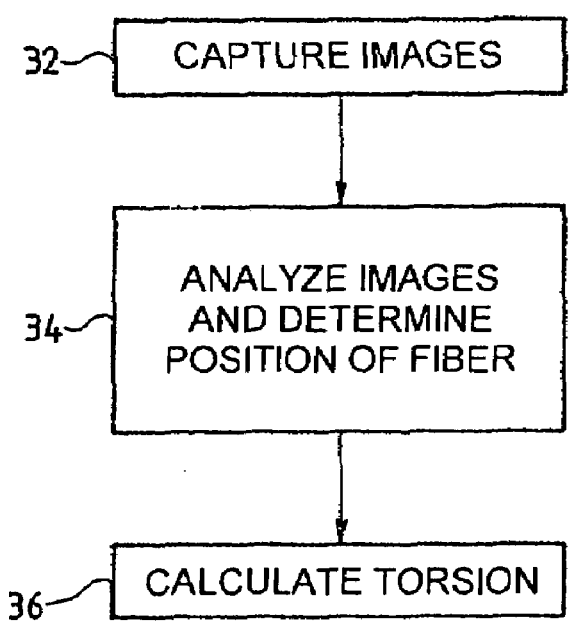

METHOD OF CONTROLLING THE POLARIZATION MODE DISPERSION OF AN OPTICAL FIBER DURING FIBER DRAWING

CROSS-REFERENCE TO RELATED APPLICATIONS

This application is based on French Patent Application No. 02 16 890 filed Dec. 31, 2002, the disclosure of which is hereby incorporated by reference thereto in its entirety, and the priority of which is hereby claimed under 35 U.S.C. § 119.

BACKGROUND OF THE INVENTION

1. Field of the Invention

The present invention relates to optical fibers and more precisely to reducing the polarization mode dispersion of such fibers during fabrication.

2. Description of the Prior Art

In an ideally circular monomode optical fiber there are two polarization modes: if the fiber is circular, the two modes propagate along the fiber with identical phase velocities. However, any asymmetry of the fiber, for example caused by a non-circular core; asymmetrical lateral stresses or index variations, induces a difference between the phase velocities of the two inherent modes, and this is known as birefringence. The birefringence of a fiber is measured by a parameter called the polarization mode dispersion, which is representative of the dispersion induced in a signal by the birefringence of the fiber. This problem of defective cylindricality of optical fibers, as just explained, arises not only with monomode optical fibers but also with other types of optical fibers.

EP-B-0 582 405 describes a standard fiber drawing installation in which a preform is heated at its end; the heated end of the preform is drawn to form an optical fiber. The installation includes diverse stations for controlling the diameter, applying a coating, controlling the concentricity and thickness of the coating, hardening the coating. The fiber is wrapped around pulleys and driven by a drawing capstan before it is wound onto a spool or drum. To reduce polarization mode dispersion, the above document proposes that one of the fiber guide pulleys be subjected to an alternating rotation movement about an axis in the fiber drawing plane. The effect of this oscillatory movement is to cause the fiber to roll on the surface of the pulley, on either side of a fiber drawing plane defined by the axis of the preform and the fiber. This lateral movement of the fiber induces torsion in and permanent deformation of the fiber being drawn. The effect of the alternating movement of the pulley is to apply torsion to the fiber in alternating directions, which reduces polarization mode dispersion. EP-A-0 744 636 proposes a solution that avoids the alternating movement of the pulley by using a simple rotation movement of a pulley having a skewed surface. As it rotates, the skewed pulley offers up to the fiber a surface equivalent to that of a wheel of circular symmetry whose axis is subjected to an alternating movement.

WO-A-98 46536 describes another system for applying torsion to a fiber in which members are in contact with the fiber, on respective opposite sides thereof. One of the members is subjected to alternating movement.

One problem with this solution is that of determining the torsion applied to the fiber or the rotation of the fiber on the oscillating device. This problem is especially complex because the fiber has a dimension that is typically of the order of 250 μm, a cylindrical shape and is drawn at velocities that can be as high as 1 500 m/min.

WO-A-01 33184 indicates that it is known in the art to introduce bubbles or other irregularities into the fiber. It is then possible, for a given adjustment of the oscillatory movement of the pulley, to measure the torsion applied to the drawn fiber. Nevertheless, a method of this kind implies drawing the fiber before being able to carry out the measurements and leads to a waste of time and fiber. It further implies a new measurement each time the characteristics of the drawing device (preform, type of coating, fiber drawing velocity, etc.) are changed. Finally, the measurement is not carried out on the fiber itself, but on a specific preform, which gives rise to a problem with the reproducibility of the method.

WO-A-01 33184 also proposes to measure the diameter of the fiber, and then to calculate a Fourier transform of the diameter. The corresponding power spectrum has peaks at a frequency of 2v where v is the frequency at which the oscillation of the pulley is reversed. The amplitude of the torsion is obtained from the spectrum, by calculating the amplitudes of the peaks of the spectrum. This solution presupposes the availability of apparatus for precisely measuring the diameter of the fiber and sophisticated computation means. This solution is also limited by its very nature to periodic oscillations of the system for preventing polarization mode dispersion.

There is therefore a need for a solution for controlling the polarization mode dispersion of an optical fiber when it is being drawn from a preform. The solution must be simple to put into practice, reliable, and not necessitate a specific preform. It must also be applicable in real time, or virtually in real time, without implying complex measurements or complex computations, and for all types of oscillation of the system for preventing polarization mode dispersion.

SUMMARY OF THE INVENTION

In one embodiment, the invention therefore proposes a method of controlling polarization mode dispersion of an optical fiber during fiber drawing, the method comprises the steps of:

applying torsion to the fiber by displacement of the fiber relative to a member, capturing at least one image of the fiber and the member, analyzing the image to determine the position of the fiber relative to the member, and calculating the torsion applied to the fiber from the determined position.

In one embodiment the step of applying torsion to the fiber comprises the displacement in rotation of the member relative to the fiber and the step of analyzing the at least one image comprises determining the angular position of the fiber relative to the member.

The step of applying torsion to the fiber advantageously comprises periodic movement of the member. The step of capturing at least one image of the fiber and the member can then be executed periodically, with a period different from that of the movement of the member.

In one embodiment the step of calculating the torsion applied to the fiber comprises calculating the number of turns through which the fiber rolls on the member. In this case the step of calculating the torsion applied to the fiber can comprise calculating the mean position of the fiber by integrating its positions.

The invention also proposes an optical fiber drawing installation comprising:

a movable member, movement of the member applying torsion to the fiber, an image sensor adapted to captures images of the fiber and the member, and an analyzer circuit for analyzing captured images, determining the position of the fiber relative to the member and calculating the torsion applied to the fiber from the position determined in this way.

In one embodiment the member is a pulley subjected to an oscillatory movement.

The image sensor is advantageously adapted to capture an image of said fiber and said pulley in the vicinity of the median point of contact between said fiber and said pulley.

Other features and advantages of the invention will become apparent on reading the following description of embodiments of the invention given by way of example and with reference to the appended drawings.

BRIEF DESCRIPTION OF THE DRAWINGS

FIG. 1 is a diagrammatic view of an installation in which the invention is used.

FIGS. 2 and 3 are diagrammatic representations of images captured at different times by the FIG. 1 installation.

FIG. 4 is a diagram of the velocities of the fiber and the pulley.

FIG. 5 is a flowchart of the method of the invention.

DETAILED DESCRIPTION OF THE PREFERRED EMBODIMENT

The invention proposes to capture images of a fiber on a pulley of a drawing or fiber drawing installation that is provided to limit polarization mode dispersion, to determine the position of the fiber relative to the pulley, and then to deduce the rotation applied to the fiber from the images obtained. Analyzing the images determines the precise position of the fiber on the pulley and therefore the angle between the fiber and the pulley. It is therefore possible to deduce from the latter information the torsion applied to the fiber. The method implies no particular calibration hardware and can be applied continuously during fiber production. It does not imply complex computations and applies to all types of oscillatory movement.

There is described hereinafter one embodiment of a method used in an installation utilizing an oscillating pulley. FIG. 1 is a diagrammatic view of an installation in which the invention is used; it shows only the components necessary to understand the invention. The figure shows the fiber 2 being drawn and the direction of movement of the fiber is symbolized by the arrow 4. Two guide pulleys 6, 8 guide the fiber before it reaches the oscillating pulley 10. The oscillating pulley is driven with an alternating rotation movement about the fiber arrival axis, which is vertical in the figure. This movement is typically at a frequency of a few hertz for a typical fiber drawing system operating at a speed from 200 to 1 800 m/min, with a maximum displacement angle relative to the fiber drawing plane that can typically reach ±9°. As explained above with reference to the document EP B-0 582 405, the oscillatory movement of the pulley causes torsion in the fiber, in alternating rotation directions, the effect of which is to reduce polarization mode dispersion. On leaving the pulley 10, the fiber is guided by fingers 12 and then passes over the drive device before it is spooled in a manner known in the art.

The invention is based on the fact that the torsion applied to the fiber being drawn is a function of the position of the fiber 2 on the oscillating pulley 10; thus measuring the position of the fiber enables the torsion applied to the fiber to be determined, as explained shortly. The figure therefore shows an image sensor 14 adapted to provide an image of the fiber on the pulley. Optical means can be used to facilitate the installation of the sensor, such as the mirror 16 shown in the figure, which reflects the image of the fiber on the pulley toward the sensor. The images produced by the sensor 14 are transmitted to an analyzer circuit 18.

The image sensor is a high-frequency video camera, for example, which captures the images at a frequency of 100 images per second. A frequency of this order produces at least 20 images of the fiber on the pulley for each cycle of the oscillating pulley, from which the movement of the fiber on the oscillating pulley is determined. The number of images for each cycle of the oscillating pulley depends on the nature of the movement of the pulley; for a simple pulley movement, fewer images for each cycle of the pulley may suffice.

For periodic oscillations, it is also possible to use a video camera capturing the images at an acquisition frequency close to the frequency of the oscillating movement of the pulley. In this case, the movement of the fiber is reconstituted from images of the fiber over a plurality of successive periods. For example, there can be an offset of 0.1 Hz between the acquisition frequency of the video camera and the oscillation frequency of the pulley. Accordingly, for a pulley oscillating at a frequency of 4.5 Hz, a complete scan of the movement of the fiber is obtained over 45 cycles of the pulley, by means of 45 images of the fiber at different times in the movement of the pulley. This solution enables a sensor operating at a lower frequency to be used to capture the images. The reliability of the measurements can be affected by vibrations in the installation; tests carried out by the inventors show that the measurements remain usable.

The images produced by the image sensor are transmitted to the analyzer circuit, in which they are analyzed to determine the position of the fiber on the pulley. The analyzer circuit is a PC, for example, provided with a port for receiving images produced by the image sensor and shape recognition software, such as the software sold under the Labview Trade Mark. The software is programmed to determine in an image the position of the fiber relative to the oscillating pulley, to be more precise the angle between the pulley and the fiber. Image processing software can also be used.

It is advantageous to measure the position of the fiber on the pulley in the position of the pulley shown here, at the intersection of the surface of the fiber with the bisector of the angle between the directions of the fiber before and after the pulley. This point is the median point of contact between the fiber and the pulley. Compared to other available measurement points, it has the advantage that the position of the fiber is less dependent on vibration of the fiber on either side of the pulley. The position of the fiber relative to the pulley is representative of the torsion applied to the fiber.

FIGS. 2 and 3 are diagrammatic representations of the images captured by the FIG. 1 installation; FIG. 2 shows the position of the pulley for a zero oscillation angle of the pulley and FIG. 3 shows the position of the pulley for a maximum oscillation angle. In these figures, the reference number 10 represents the pulley and the reference number 22 designates the rotation axis of the pulley driving the fiber 2. The reference number 24 designates the fiber drawing plane. The oscillation axis of the pulley is at an angle of 45° to the plane of FIGS. 2 and 3. The reference number 26 represents the contours of the image captured by the image sensor 14.

In FIG. 2, the pulley is at a zero angle to the fiber drawing plane 24, which in this position coincides with the median plane of the pulley. The angle α between the pulley and the fiber is zero. This position corresponds to the position of a pulley of a standard system with no oscillatory movement of the pulley to reduce polarization mode dispersion. In figure 3, the pulley has turned through an angle β in its oscillatory movement. The fiber has moved relative to the pulley, with the result that the fiber forms an angle α with the pulley— with the edge or the median plane of the pulley. The reference number 26 in FIG. 3 shows the image captured by the image sensor 14. It is clear that this image can be used to measure the angle α, either by recognizing the fiber 2 in the image and knowing the angle of oscillation of the pulley or by determining from the image the position of the pulley relative to the fiber.

The angle determined in this way is representative of the number of turns through which the fiber has rolled on the surface of the pulley and is therefore representative of the torsion applied to the fiber. The torsion can be calculated using the following formula, which gives the torsion applied to the fiber in turns/meter, d being the diameter in meters of the fiber traveling over the pulley:

$$V = \frac{\cos(\alpha) \cdot \sin(\alpha)}{\pi \cdot d}$$

FIG. 4 is a diagram of the velocities of the fiber and the pulley, for the purpose of explaining the above formula. The figure shows the axis 28 of the fiber and the median plane 30 of the pulley. The figure also shows the velocity $V_F$ of the fiber, the velocity $V_P$ at the surface of the pulley and the rotation velocity $V_{ROT}$ of the fiber, or the transverse velocity of the fiber, as it is otherwise known. The figure further shows the angle α between the velocity of the fiber and the velocity of the pulley. The rotation velocity $V_P$ of the pulley about its rotation axis corresponds to the component in the median plane of the pulley of the velocity $V_F$ of the fiber, so that $V_P = V_F \cdot \cos α$. The transverse velocity of the fiber is imparted to the fiber by the relative movement of the pulley and therefore corresponds to the component of the velocity $V_p$ of the pulley orthogonal to the direction of the fiber. Thus: $V_{ROT} = V_P \cdot \sin α = V_F \cdot \sin α \cdot \cos α$.

It is usual to measure the instantaneous torsion in terms of the number of turns per meter of fiber. The torsion or velocity in turns per meter is therefore written $$V = \frac{V_{ROT}}{\pi \cdot d \cdot V_F} = \frac{\cos(\alpha) \cdot \sin(\alpha)}{\pi \cdot d}$$

In the case of a periodic movement, the mean angle can be calculated for a half-period, i.e. for the movement of the fiber on one side of the fiber drawing plane, from which the mean value $V_M = \sin α_M \cdot \cos α_M / \pi d$ of the torsion in one rotation direction of the fiber can be deduced.

To determine the angle $α_M$, the graph of the function associating time and the angle α can be determined from the images, this function approximated by a second, third or fourth order polynomial, and the integral of the function over a half-period calculated. This method is particularly suitable in that the polynomial approximation alleviates errors in analyzing an image or vibration at the moment an image is captured.

Tests have been carried out with a fiber drawing installation of the type represented in FIG. 1. In a first case, a fiber drawing velocity of 600 m/min, a pulley oscillation frequency of 4.5 Hz, and an oscillation angle of ±8° were applied. This configuration conventionally yields a mean rotation velocity of the fiber of six rpm (revolutions per minute). Application of the method as described with reference to the figures can determine this value from images captured at a frequency of 4.6 Hz and analysis of the images corresponding to one half-period. In a second case, a fiber drawing velocity of 600 m/min, a pulley oscillation frequency of 4.5 Hz, and an oscillation angle of ±6° were used. This configuration conventionally yields a rotation velocity of the fiber of 4.3 rpm. Once again, application of the method as described with reference to the figures can determine this value.

The images produced by the image sensor 14 can thus be analyzed in the analyzer circuit 18 to determine the torsion applied to the fiber. It is then possible, in real time or virtually in real time, to adjust the oscillation parameters of the oscillating pulley, and in particular the oscillation frequency or amplitude. The adjustment of these parameters is represented in the figure by the arrow 20 connecting the analyzer circuit 18 and the oscillating pulley.

FIG. 5 is a flowchart of the method of the invention. The step 32 is a step of capturing images of the fiber. The step 34 is a step of analyzing the images to determine the position of the fiber. The step 36 is a step of calculating the torsion from the position determined in step 34.

The method described with reference to FIG. 1 has the advantage that it can be applied not only to an oscillating pulley, as in the example shown in the figure, but also and more generally to any system for reducing polarization mode dispersion, such as the prior art methods referred to above. It can be used for a triangular waveform movement of the pulley, i.e. for a movement at constant angular velocity over each half-period of oscillation; it also applies to other movements, for example sinusoidal oscillations. Unlike the prior art solutions, the method is applied during fabrication of the fiber, without it being necessary to calibrate the fiber drawing apparatus with a specific preform. This saves time and resources, and makes the results obtained more reliable.

The method can display the mean rotation velocity of the fiber, so that the oscillatory movement can be controlled in real time, can also determine the evolution of the rotation velocity over one or more periods of operation of the polarization mode dispersion reducing system. This information can be used not only to adjust the polarization mode dispersion reducing system but also to track the alignment of the equipment.

Of course, the invention is not limited to the embodiments referred to above; thus it applies to a different configuration of the fiber drawing apparatus. The invention can also be applied to movement other than an oscillatory rotation movement of the pulley, such as an alternating movement in translation; in this case, the above formula could be adapted, the rotation being calculated by dividing the horizontal displacement of the roller relative to the fiber by the circumference of the fiber. The member applying the torsion to the fiber is not limited to a pulley, but can have a different shape. Techniques other than those mentioned in the examples can be used to capture and analyze the images. The method applies not only to periodic movements, but also to anti-PMD systems with aperiodic or pseudo-periodic movements.

The invention claimed is:

1. A method of controlling polarization mode dispersion of an optical fiber during fiber drawing, said method comprises the steps of:
    applying torsion to said fiber by displacement of said fiber relative to a member,
    capturing at least one image of said fiber and said member,
    analyzing said image to determine the position of said fiber relative to said member, and
    calculating said torsion applied to said fiber from said determined position.

2. The method claimed in claim 1 wherein said step of applying torsion to said fiber comprises the displacement in rotation of said member relative to said fiber and said step of analyzing said at least one image comprises determining the angular position of said fiber relative to said member.

3. The method claimed in claim 2 wherein said step of applying torsion to said fiber comprises periodic movement of said member.

4. The method claimed in claim 3 wherein said step of capturing at least one image of said fiber and said member is executed periodically, with a period different from that of said movement of said member.

5. The method claimed in claim 1 wherein said step of calculating said torsion applied to said fiber comprises calculating the number of turns through which said fiber rolls on said member.

6. The method claimed in claim 5 wherein said step of calculating said torsion applied to said fiber comprises calculating the mean position of said fiber by integrating its positions.

* * * * *